United States Patent [19]

Hall

[11] 4,072,257
[45] Feb. 7, 1978

[54] LOAD CARRYING APPARATUS

[76] Inventor: Robert Eugene Hall, 4187 Mogadore Road, Kent, Ohio 44240

[21] Appl. No.: 658,409

[22] Filed: Feb. 17, 1976

[51] Int. Cl.² .............................................. B60R 9/10
[52] U.S. Cl. .................................. 224/29 R; 105/469; 105/477; 200/61.59; 224/42.03 B; 340/280; 340/282
[58] Field of Search ................. 224/42.03 R, 42.03 A, 224/42.03 B, 42.05, 42.08, 42.39, 42.43, 42.44, 42.41, 42.45 R, 29 R, 30 R, 31, 32 A, 39, 42.06; 214/450; 293/4, 69 R, 73; 280/179 A, 477, 163, 164 R, 164 A, 166; 296/26; 70/441; 403/13, 14, 27; 200/61.59; 340/101, 102, 275, 280, 282; 52/73, 693, 694; 105/368 T, 470, 471, 472, 473, 475, 477, 483; 254/51

[56] References Cited

U.S. PATENT DOCUMENTS

| 893,082 | 7/1908 | Lind | 403/27 X |
|---|---|---|---|
| 1,090,477 | 3/1914 | Hedstrom | 224/31 X |
| 2,623,760 | 12/1952 | Fornelius | 280/179 A |
| 2,946,563 | 7/1960 | Eaton | 280/179 A X |
| 3,251,520 | 5/1966 | Van Dyke et al. | 224/42.03 B |
| 3,553,671 | 1/1971 | Hopkins | 340/282 X |
| 3,588,160 | 6/1971 | Reiner | 293/69 R X |
| 3,606,385 | 9/1971 | Johannes | 224/42.04 X |
| 3,650,443 | 3/1972 | Haskett et al. | 224/42.03 A |
| 3,730,580 | 5/1973 | Page, Jr. | 296/26 X |
| 3,850,353 | 11/1974 | Foulds | 224/31 |
| 3,905,166 | 9/1975 | Kaiser | 52/73 X |
| 3,963,158 | 6/1976 | Clenet | 224/31 |

FOREIGN PATENT DOCUMENTS

| 567,063 | 6/1923 | France | 224/42.39 |
|---|---|---|---|
| 863,908 | 1/1953 | France | 224/39 |
| 1,434,121 | 10/1960 | Germany | 52/693 |
| 529,547 | 6/1955 | Italy | 280/477 |
| 262,568 | 12/1926 | United Kingdom | 224/42.44 |

Primary Examiner—Robert J. Spar
Assistant Examiner—Winston H. Douglas
Attorney, Agent, or Firm—Mack D. Cook, II

[57] ABSTRACT

An apparatus selectively attached to a vehicle for carrying a load on a platform. The apparatus frame comprises horizontally extending struts carrying the platform and telescopically positioned within and secured to brackets mounted on the vehicle frame. The outer end of a strut houses a fastening assembly for applying a releasable tension to an anchored strap extended over, or connected to, a load carried on the platform. The strap may be anchored to the load, the apparatus frame, or the vehicle. The inner end of a strut houses components of an electrical circuit assembly for supplying current to signal lights on the apparatus frame. The lights may be illuminated when the struts are correctly positioned for securing to the brackets mounted on the vehicle frame.

8 Claims, 9 Drawing Figures

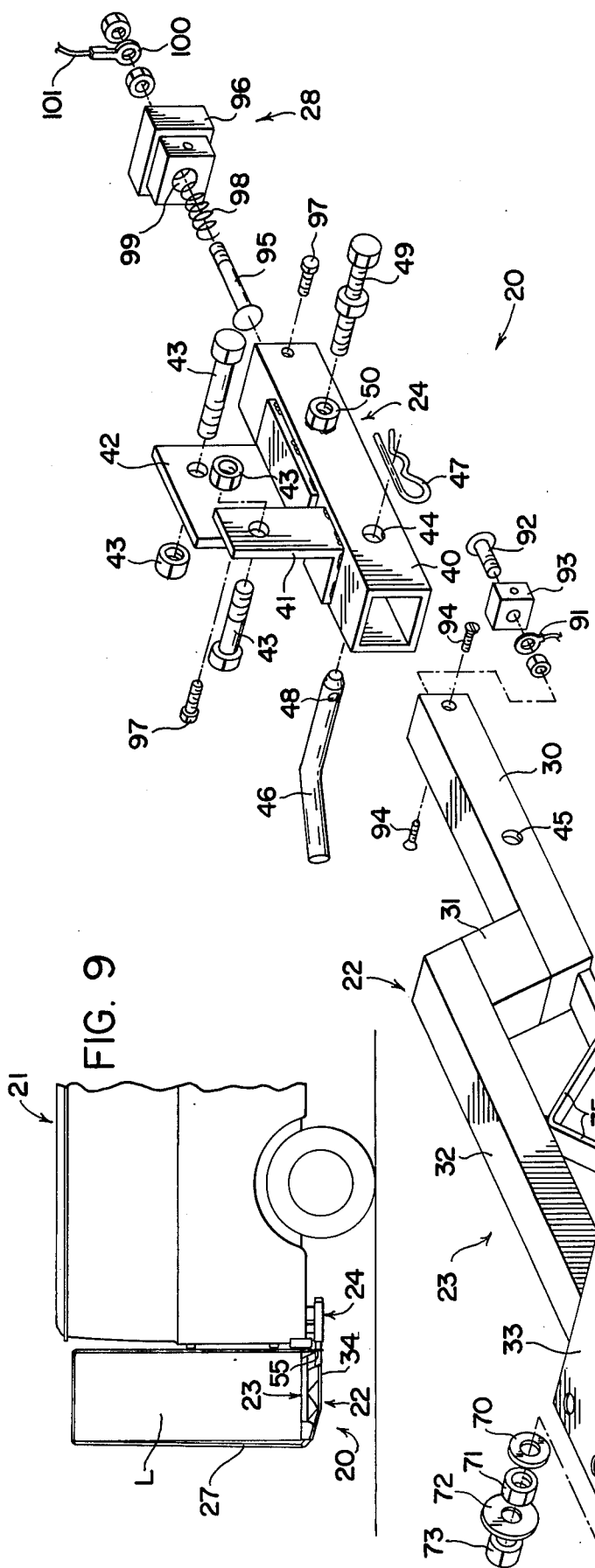
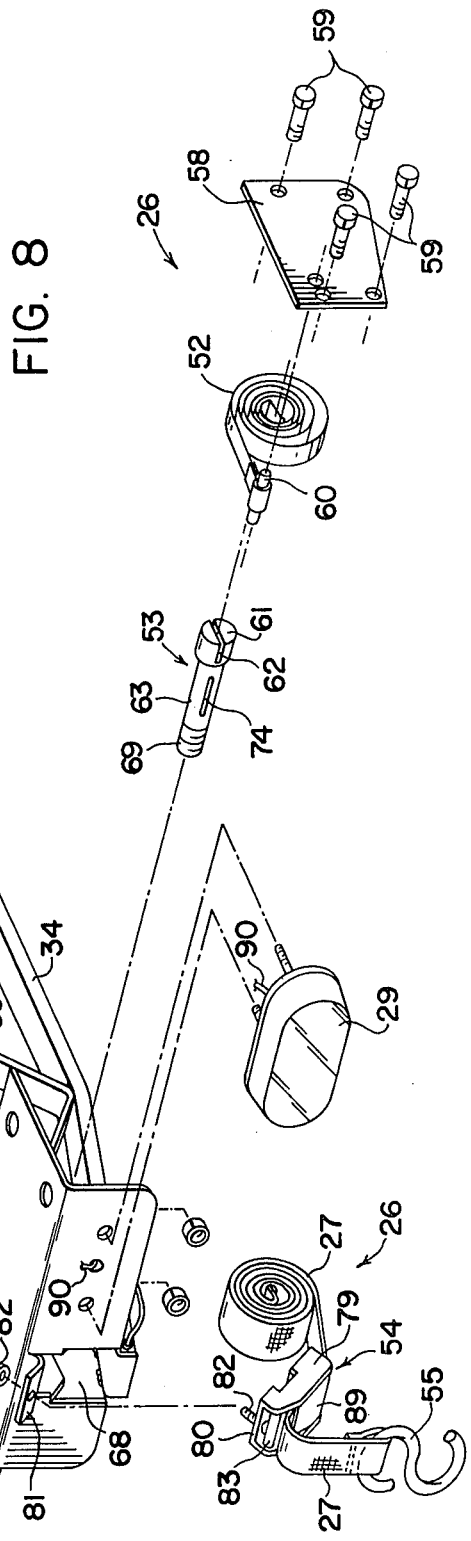
FIG. 8
FIG. 9

4,072,257

LOAD CARRYING APPARATUS

BACKGROUND OF THE INVENTION

The invention relates to a load carrying apparatus. More particularly, the invention relates to an apparatus having a frame and platform which may be selectively attached, quickly mounted or demounted, on either the rear or side of a vehicle. The vehicle may be a car, a pick-up truck, a camper, or a van. When the apparatus is mounted on the rear of a vehicle, the load carried may be a motorcycle, a bike, a snowmobile, a trunk, any object or package which can be placed on the frame platform. When side mounted, the platform may be adapted for use as a porch, or to support a table, a workbench, or the like.

Vehicle attached package and article carriers are not new. Many types having various features and constructions are now in use. Many types are particularly constructed to carry one particular type of object, e.g., a motorcycle. Prior art relevant to the invention may be found in Class 224, Package and Article Carriers, subclass 42, Vehicle Attached, and in Class 214, Material or Article Handling, subclass 450, Vehicle Attached Article Carriers. The prior patent art has been reviewed and U.S. Pat. No. 3,912,098, Oct. 1975, Nicotra; U.S. Pat. No. 3,367,548, February 1968, Cooper; U.S. Pat. No. 3,251,520, May 1966, Van Dyke; et al; U.S. Pat. No. 3,796,333, March 1974, Goldstein; U.S. Pat. No. 3,591,029, July 1971, Coffey; and U.S. Pat. No. 3,805,984, April 1974, Schwarz, et al, have been selected as the most pertinent prior art. U.S. Pat. No. 3,678,542, July 1972, Prete, Jr., is pertinent to the clamping means 54 as disclosed herein.

A load carrying apparatus according to the invention has greater utility and many advantages over the prior art vehicle attached package and article carriers.

SUMMARY OF THE INVENTION

It is an object of the invention to provide an improved load carrying apparatus selectively attachable to a vehicle for carrying a load on a platform.

It is a further object of the invention to provide a load carrying apparatus having a frame comprising horizontally extending struts carrying the platform and telescopically positioned within and secured to brackets mounted on the vehicle frame.

Still further, it is an object of the invention to provide a strut housing a fastening assembly for applying a releasable tension to an anchored strap extended over, or connected to, a load carried on the platform, the tension being first provided by a retractive force exerted automatically on the strap and thereafter provided, if desired, by manual actuation.

Still further, it is an object of the invention to provide a strut housing components of an electrical circuit assembly for supplying current to lights on the apparatus frame, the lights being illuminated when the struts are correctly positioned for securing to the brackets mounted on the vehicle frame.

These and other objects of the invention, and the advantages thereof, will be apparent in view of the description of a preferred embodiment, as set forth below.

In general, a load carrying apparatus according to the invention is attached to a vehicle for carrying a load on a platform. The apparatus has a frame structure comprising horizontally extending struts carrying the platform and secured to the vehicle frame. The outer end of a strut preferably houses a fastening assembly for applying a releasable tension to an anchored strap extended over, or connected to, a load carried on the platform. The inner end of a strut may be telescopically positioned within and secured to a bracket mounted on the vehicle frame. The inner end of a strut may also house components of an electrical circuit assembly for supplying current to a signal light on said frame structure. The signal light may be illuminated by the electrical circuit assembly when the strut is correctly positioned for securing to a bracket mounted on the vehicle frame.

A strut for a load carrying apparatus according to the invention may be a stepped biplanar element having an inner portion adapted for attachment to a vehicle frame and carrying a pedestal portion, the pedestal portion supporting an outer portion comprising a platform for a load carried by the strut, said strut further having a truss element extending between the outer end of the inner portion and the outer end of the outer portion.

A fastening assembly according to the invention for applying releasable tension to an anchored strap extended over, or connected to, a load on a platform carried by horizontally extending struts secured to a vehicle frame is housed within the outer end of a strut and has a torsion means for strap recoil, a winching rotor operatively interconnecting the torsion means and the inboard end of a strap, and a clamping means for releasably engaging the middle of a strap between the ends.

DESCRIPTION OF THE DRAWINGS

FIG. 8 is a perspective exploded view showing components of the load carrying apparatus; and FIG. 9 is a reduced side view, similar to FIG. 1, showing the apparatus of the invention carrying a large bulky load.

DETAILED DESCRIPTION OF THE INVENTION

Figure 1:
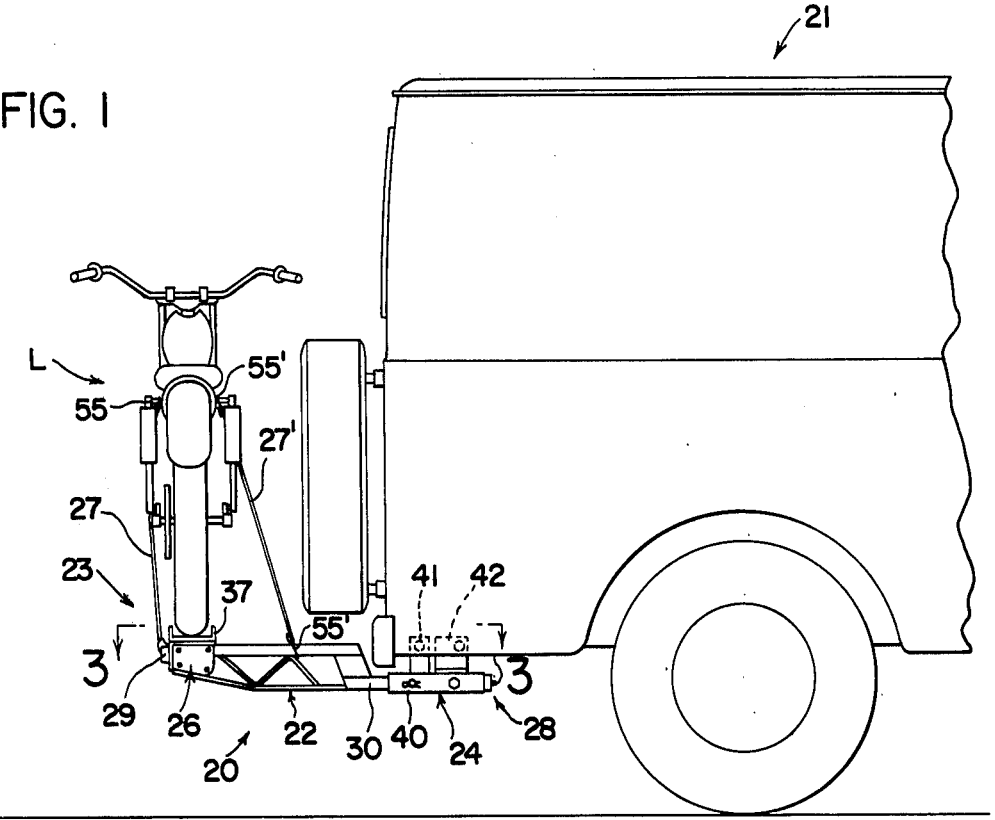
FIG. 1 is a side view of the load carrying apparatus according to the invention, attached at the rear of a van vehicle and carrying a motor bike on a platform.

A load carrying apparatus according to the invention is referred to generally by the numeral 20. The apparatus 20 is attached to a vehicle referred to generally by the numeral 21. The apparatus 20 has a frame structure comprising horizontally extending struts referred to generally by the numeral 22, carrying a platform referred to generally by the numeral 23, and telescopically positioned within and secured to brackets referred to generally by the numeral 24. The brackets 24 are mounted on the vehicle frame referred to generally by the numeral 25.

The outer end of each strut 22 houses a fastening assembly referred to generally by the numeral 26 for applying a releasable tension to an anchored strap 27 extended over, or connected to, a load indicated at L carried on the platform 23. The strap 27 may be of a suitable fabric or woven composition having a high tensile strength or breaking point. The inner end of a strut 22 houses components of an electrical circuit assembly referred to generally by the numeral 28 for supplying current to signal lights 29 on the apparatus frame. The lights 29 may be illuminated by the electrical circuit assembly 28 when the struts 22 are correctly positioned for securing to the brackets 24 mounted on the vehicle frame 25.

The Strut 22

Figure 4:
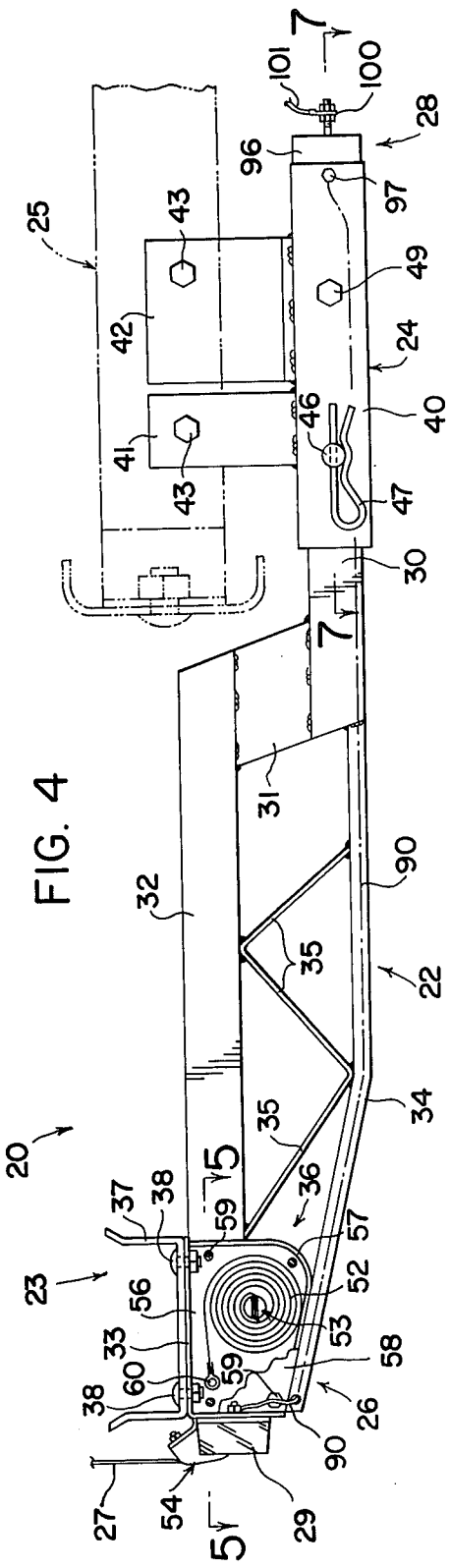
FIG. 4 is a side view of the apparatus of FIG. 3, partially broken away to show details of a fastening assembly.

As best shown in FIGS. 1, 4, and 8, a strut 22 may be fabricated as a stepped biplanar element. The inner portion 30 may be adapted for telescopic insertion within a correspondingly shaped bracket 24. The outer end of the inner strut portion 30 carries an integrally connected upwardly directed or pedestal portion 31. The pedestal strut portion 31 supports the inner end of an integrally connected outwardly directed strut portion 32. As shown in FIG. 4, the relative dimensions in side view of the pedestal portion 31 and the longitudinally extending inner and outer portions, 30 and 32, are such that the longitudinal extent of the pedestal portion, between the portions 30 and 32, is substantially twice the transverse cross-section, or vertical extent, of either the adjacent outer end of an inner strut portion 30 or the adjacent inner end of an outer strut portion 32. The upper surface of a strut portion 32 may function as the platform 23 per se, or as shown, the support surface for a platform mounting plate 33 secured to a strut portion 32, as by welding, above a fastening assembly 26. A truss element 34 extends between the outer end of a strut portion 30 and the outer end of a strut portion 32. As shown in FIG. 4, each truss element 34 comprises a substantially horizontally oriented inner portion and an upwardly inclined outer portion. The inner area spanned by the truss element 34 may enclose suitably attached and positioned strengthening web plates 35. The outer area spanned by the truss element 34, indicated at 36, may house components of the fastening assembly 26. The under surface of the strut truss 34 will also function as a protective rail or "skid" causing the apparatus 20 to ride up and over a low lying obstacle or a curb unintentionally encountered when the vehicle 21 is moving.

The Platform 23

Figure 2:
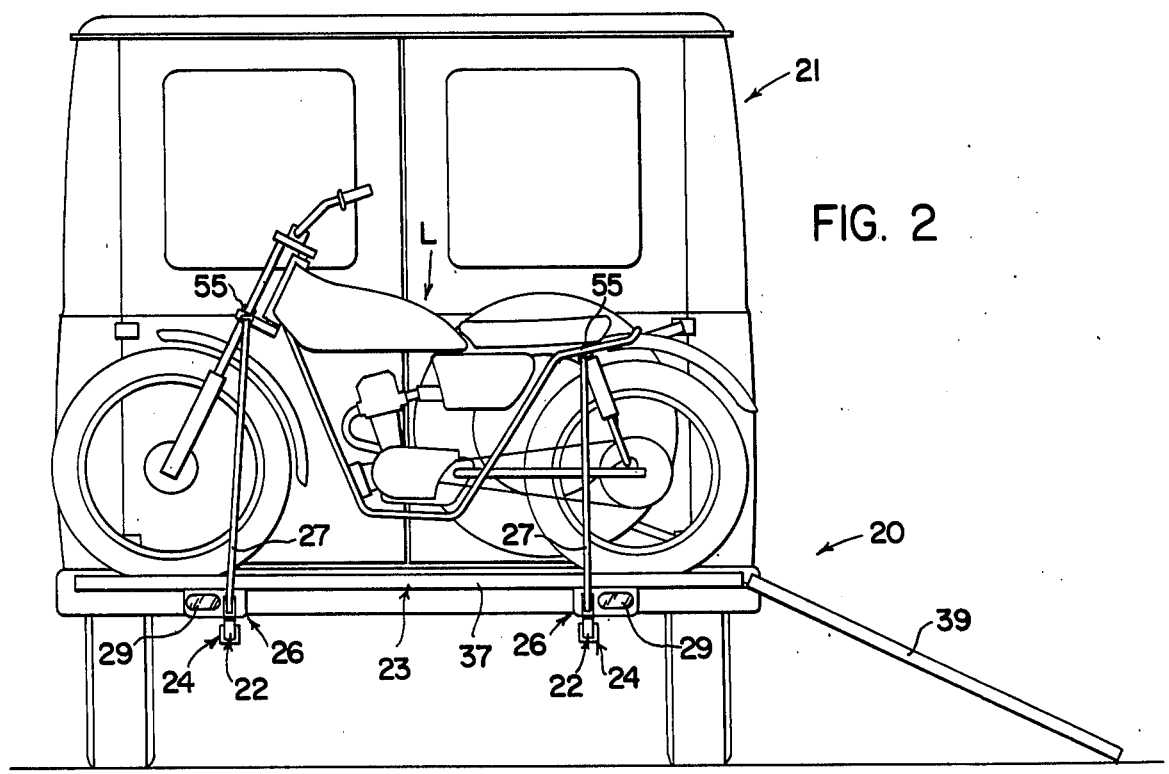
FIG. 2 is a rear view of FIG. 1, and further showing a detachable ramp in position for loading a motorcycle onto the platform.

As best shown in FIGS. 1, 2, 3, and 4, the load carrying platform 23 may be a trough-shaped member 37 extending transversely across the outer ends of the struts 22 and attached to suitably drilled mounting plates 33, as by nut and bolt sets 38. It is intended that the platform member 37 be suitably shaped to receive and carry a specific object, e.g., a motorcycle. As shown in FIG. 2, one end of the platform member 37 may be adapted to receive and support a detachable loading ramp 39 for loading a motorcycle onto the platform 23. Alternatively, as shown in FIG. 9, it is intended that the platform member 37 may be detached and removed for carrying a large or bulky object L on the platform 23.

The Bracket 24

Figure 3:
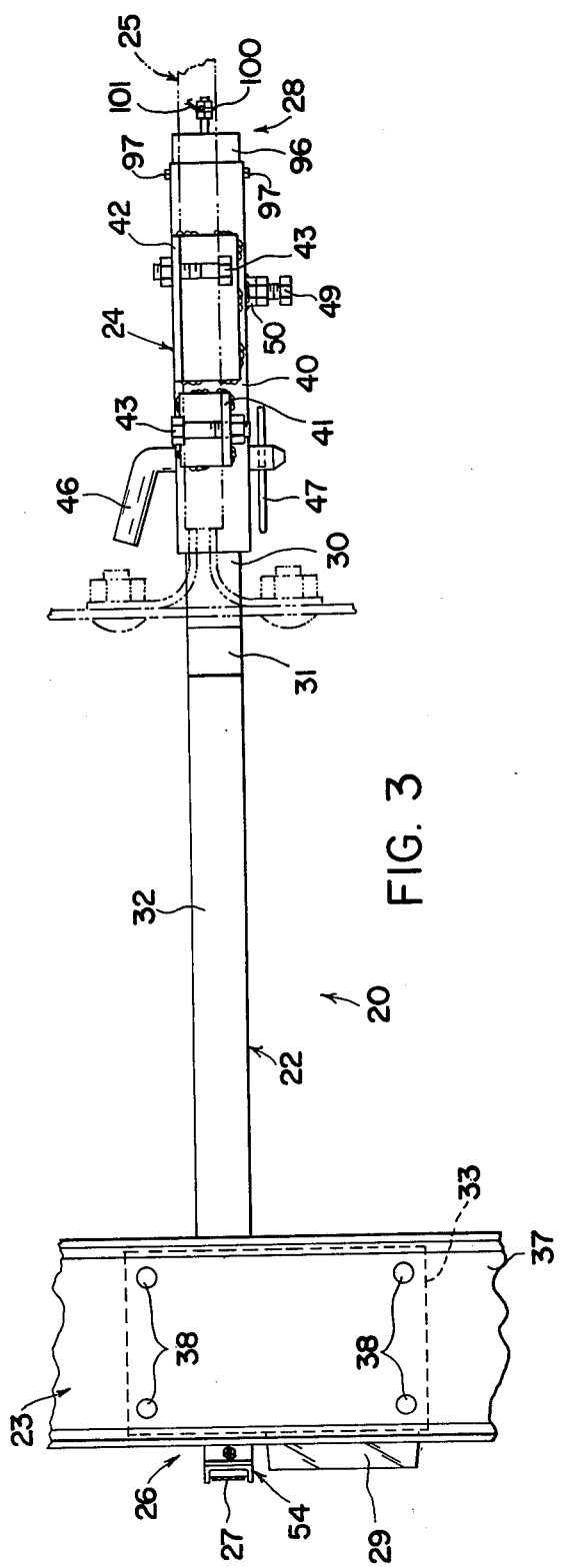
FIG. 3 is a plan view taken substantially as indicated on line 3—3 of FIG. 1.

As best shown in FIGS. 1, 3, 4, and 8, a bracket 24 is a fabricated element having an elongate receiver portion 40 for telescopic insertion of a correspondingly shaped inner strut portion 30. The receiver portion 40 has attached thereto, as by welding, suitably dimensioned and shaped flange elements for interconnection with elements of the vehicle frame 25. Referring to FIGS. 3 and 4, the vehicle frame elements shown in chain lines extend rearwardly of the vehicle 21 to mount a bumper. The interconnection flange elements, 41 and 42, are intended to function as staggered flanges suitably drilled for mounting of the bracket 24 on a vehicle frame 25, as by nut and bolt sets 43. When a strut 22 is correctly positioned within a bracket 24, transverse bores 44 in the receiver portion 40 will be aligned with corresponding bores 45 in the strut portion 30. Thereafter, the shank of a strong fastening pin 46 may be inserted through the aligned bores 44 and 45 and secured by a safety clip 47 inserted through a cross-bore 48 in the fastening pin 46. As an additional safety factor, a stop bolt and nut set 49 receivable in a nut 50 attached around a bore 51 in the receiver portion 40 may be hand tightened to secure the strut 22 within the bracket 24.

The brackets 24 are mounted as shown for attachment of the load carrying apparatus 20 on the rear of a vechile 21. It is intended that auxiliary brackets (not shown), similar to the brackets 24, could be attached to the vehicle frame 25 on the side of a vehicle 21 so that the platform 23 may be adapted for use as a porch, or to support a table, workbench, or the like.

The Fastening Assembly 26

As best shown in FIGS. 4, 5, 6, or 8, the fastening assembly 26 for applying a releasable tension to an anchored strap 27 extended over, or connected to, a load L carried on the platform 23 has as the primary components thereof a torsion means for strap recoil indicated at 52, a winching rotor indicated at 53 and operatively interconnecting the torsion means 52 and the inboard end of a strap 27, and a clamping means indicated at 54 for releasably engaging the middle of a strap 27 between the ends. The outboard end of the strap 27 carries a suitable anchoring means such as an S-shaped hook 55.

The torsion means 52 and the rotor 53 are positioned within the outer area 36 defined by the truss element 34 and below the platform mounting plate 33. The clamping means 54 is positioned adjacent the outer end of a strut portion 32.

Figure 5:
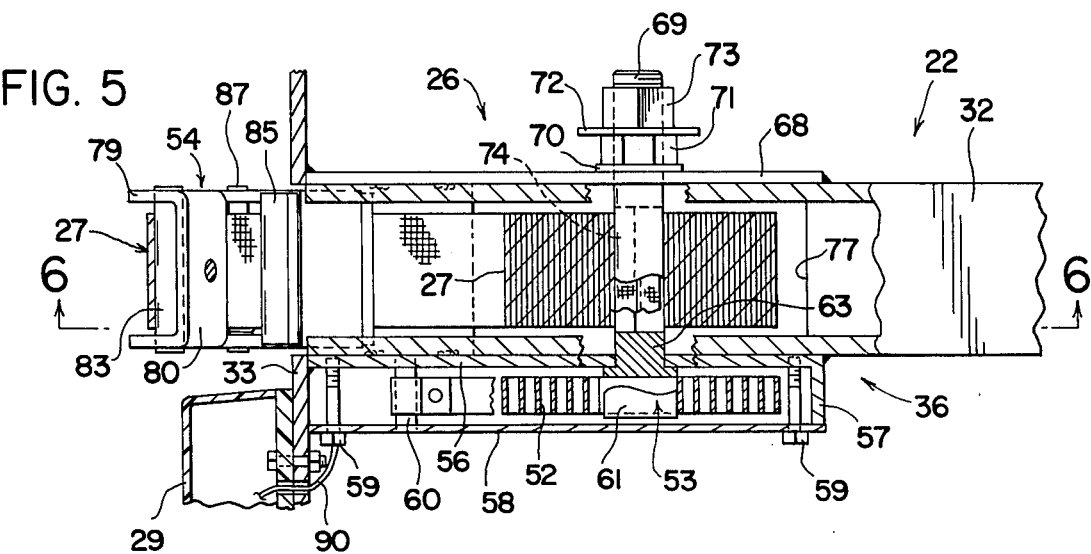
FIG. 5 is an enlarged sectional plan view taken substantially as indicated on line 5—5 of FIG. 4, showing further details of the fastening assembly for applying releasable tension to an anchored strap extended over, or connected to, a load carried on the platform.

Referring specifically to FIGS. 4 and 5, the torsion means 52 may be fabricated as a spring which may be wound or coiled to develop an action force. The coiled spring 52 is positioned adjacent a base plate 56 attached, as by welding, to a side of an outer strut portion 32. The base plate 56 may have a continuous flange portion 57 defining the inner and bottom sidewalls of a housing or chamber for the coiled spring 52. The outer sidewall of such a housing may be defined by a downward extension of the platform mounting plate 33. The mounting plate 33, or an equivalent element, may define the upper sidewall of such a housing. The outer wall of such a housing, opposite the base plate 56, may be defined by a suitably shaped cover plate 58 attached to the base plate 56, as by stud bolts 59. The outboard end of the coiled spring 52 is restrained, as by a mounting pin 60 extending between the base plate 56 and the cover plate 58.

Referring specifically to FIGS. 5 and 8, the winching rotor 53 may be fabricated as a bolt-like element. The rotor 53 has a head 61 positioned adjacent a base plate 56 and having a slot 62 for confining the inboard end of a coiled spring 52. The rotor 53 has a shank 63 extending through, or transverse the interior of, a strut portion 32. The shank 63 is journaled by, or rotates within, aligned bores (not numbered) in the base plate 56 and the strut portion 32, and aligned bores (also not numbered) in the strut portion 32 and a support plate 68. The support plate 68 is attached, as by welding, to the strut portion 32.

The end of the rotor 53 projecting outwardly of the cover plate 68 has peripheral threads 69. An inner washer 70 and an inner nut 71 engaging the threads 69 secure the rotor 53 in an operative position. An outer washer 72 and an outer winch nut 73 engaging the threads 69 function to impart a winching action to the rotor 53 for final tightening of an anchored strap 27, as by the use of a wrench (not shown) applied to the nut 73.

Figure 6:
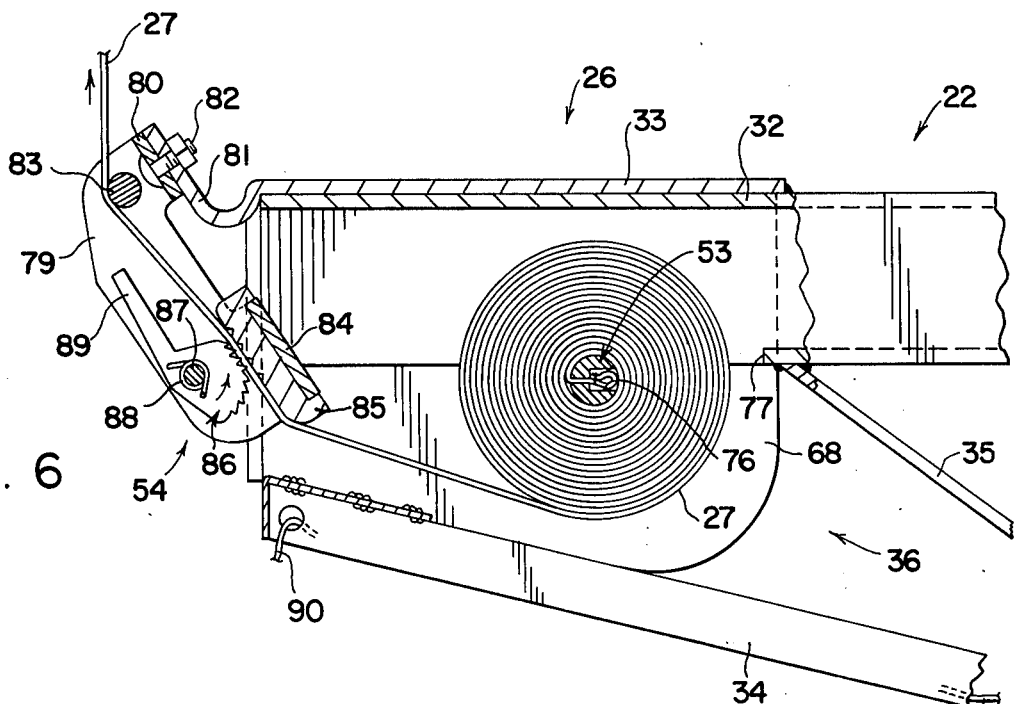
FIG. 6 is a sectional side view taken substantially as indicated on line 6—6 of FIG. 5.

Referring specifically also to FIG. 6, the strap 27 is wrapped or coiled around the rotor shank 63 and the inboard end of the strap is attached to the rotor shank, as by a shouldered slot 74. The slot 74 has a throat (not numbered) dimensioned to receive a single thickness of the strap 27. The throat opens into an enlarged groove portion 76 dimensioned to receive a double thickness of the strap 27. A folded over strap end, with one or more wraps around the rotor shank, should not pull free or loose from the rotor 53. A chamber or housing for the coiled strap is defined by the support plate 68, the upper surface of the outer strut portion 32, the base plate 56, and the strut truss 34. During fabrication of the strut 22, the lower surface of the outer strut portion 32 is terminated, as indicated at 77.

Referring specifically to FIGS. 5, 6, and 8, the clamping means 54 is positioned adjacent the outer end of a strut portion 32 and in linear alignment with the coiled strap 27. The clamping means 54 includes a stationary hasp 79 housing the strap 27. The hasp 79 is attached to the outer strut portion 32, as by an upper cross plate 80 connected to an extension 81 of the platform mounting plate 33 by a nut and bolt set 82. Preferably, a guide rod 83 is positioned outwardly of the upper hasp plate 80. The hasp 79 also has a lower cross plate 84 carrying a pad 85 with serrated surfaces. Outwardly of the clamp pad 85, a pivotable cam pawl 86 with serrated surfaces is mounted on a support pin 87. A torsion spring 88 positioned coaxially of the support pin 87 normally biases the cam pawl 86 toward the clamp pad 85 for holding the strap 27 in clamping engagement between the opposed serrated surfaces. The cam pawl 86 carries an actuating plate 89 to selectively release the strap 27 from clamping engagement between the serrated surfaces on the clamp pad 85 and the cam pawl 86, permitting extraction of the strap for load L fastening.

The Electrical Circuit Assembly 28

Components of the electrical circuit assembly 28 for supplying current to the signal lights 29 are housed within the inner end of a strut portion 30. Suitable wiring, indicated at 90, extends through the strut portion 30 and the strut truss 34 for connection to a light 29.

Figure 7:
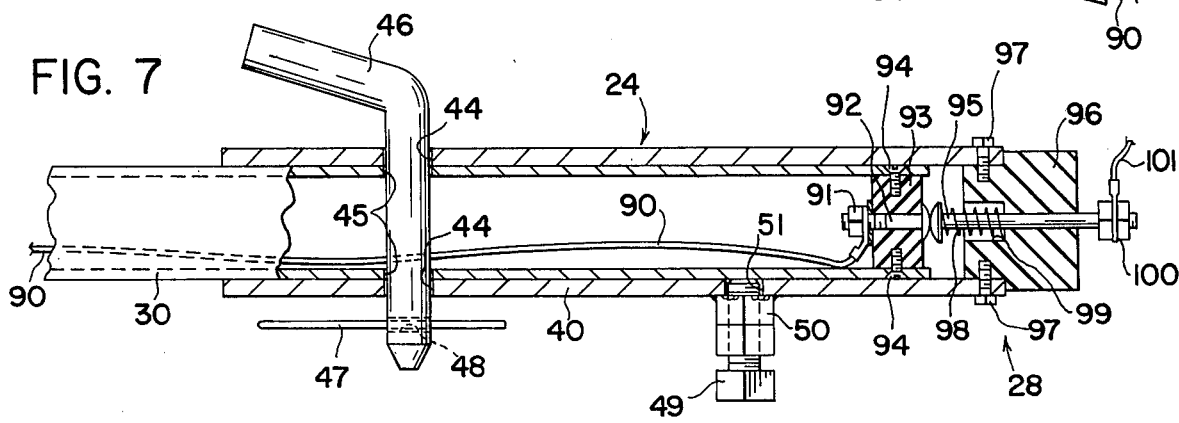
FIG. 7 is another sectional top view taken substantially as indicated on line 7—7 of FIG. 4, showing details of the apparatus mounting on the vehicle and an electric current assembly for supplying current to signal lights on the apparatus frame.

Referring specifically to FIGS. 7 and 8, the wiring 90 is connected, as at 91, to a first terminal button 92. A terminal button 92 is carried within an insulating block 93. The insulating block 93 is secured within the strut portion 30, as by flat head screws 94. The bracket 24 carries a second terminal button 95 within an insulating block 96. The insulating block 96 is secured to the inner end of a bracket receiver portion 40, as by caphead screws 97. The terminal button 95 may be movable within the insulating block 96 and is normally biased toward contact with the opposed button 92, as by a compression spring 98 fitted coaxially around the shank of button 95 and seated within a bore 99 in the block 96. The free end of the terminal button 95 is connected as at 100, to vehicle wiring 101 connected to a source of current (not shown).

It is intended that the relative placement of the terminal buttons 92 and 95 be such that current transmitting contact will be made, for illumination of a signal light 29, when the strut portion 30 is correctly positioned within the receiver portion 40 so that the transverse bores 44 and 45 will be aligned. Thereafter, the shank of the fastening pin 46 may be readily inserted and secured by the safety clip 47.

Summary

The apparatus 20 is used by first attaching (preferably permanently) the brackets 24 to the vehicle frame 25. The struts 22 are then inserted into the brackets 24, using the electrical circuit assembly 28, if desired, and secured by the pin 46, and preferably also be the stop bolt and nut assembly 49. The platform 23 is ready to carry a load L.

When the load L is on the platform 23, the user depresses the cam pawl actuating plate 89 of the clamping means 54 and extracts or pulls out the strap 27 from the fastening assembly 26. The coiled strap 27 will unwind (clockwise, as viewed in FIG. 6), and a rotative force will be applied to the rotor 53. The rotor 53 will apply a rotative tightening force to the torsion means 52 (clockwise, as viewed in FIG. 4). The user will attach the strap hook 55 over the load L to a connection point on the strut 22, or the vehicle 21 (see FIG. 9). Alternatively, when the load L is a motorcycle, as shown in FIGS. 1 and 2, the strap hook 55 may be attached to an outboard connection point on the motorcycle. The motorcycle may be further restrained and held upright by an auxiliary strap 27' of predetermined length having double hooks 55', the lower hook 55' anchored to a strut 22 and the upper hook 55' attached to an inboard connection point on the motorcycle.

To tighten the anchored strap 27, the user merely releases the strap 27 allowing the torsion means 52 to recoil the strap 27 around the rotor 53 (counterclockwise, as viewed in FIGS. 4 and 6). Thereafter, the user may apply further tension to the anchored strap, by use of a wrench (not shown) applied to the rotor nut 73 in a counterclockwise direction, as viewed in FIGS. 4 and 6. This external winching force applied to the rotor 53 will further shorten and securely tighten the anchored strap 27 and safely hold the load L on the platform 23.

When the user desires to remove the load L from the platform 23, the actuating plate 89 on the clamping means 54 is depressed freeing the strap 27 for a limited extraction from the fastening assembly 26 so that the strap hook 55 may be unanchored or detached. Thereafter, release of the strap 27 will result in the torsion means 52 acting on the rotor 53 to recoil, retract, or rewind the strap 27 into the fastening assembly 26. Preferably, the torsion means 52 is always tending to recoil the strap 27 into the fastening assembly 26. Therefore, in the event the anchored strap 27 should elongate or stretch, as by exposure to moisture or high humidity, the load L will remain safely held on the platform 23.

What is claimed is:

1. A load carrying apparatus selectively attachable to a vehicle for carrying a load on a platform, said apparatus comprising a pair of transversely spaced, longitudinally extending struts carrying said platform, each said strut having an inner portion adapted to be secured to said vehicle by telescopic insertion into a bracket secured to the underside of said vehicle, each said strut being a stepped biplanar element wherein said inner strut portion is longitudinally extending and carries an upwardly directed pedestal portion supporting a longitudinally extending outer portion each said outer strut portion being adapted for mounting said platform thereon, the longitudinal extent of said pedestal portion being substantially twice the transverse cross-section of either the adjacent outer end of said inner strut portion or the adjacent inner end of said outer strut portion, and a longitudinal truss element extends below said outer strut portion from the outer end thereof to said outer end of said inner strut portion, each said truss element comprising a substantially horizontally oriented inner portion and an upwardly inclined outer portion, whereby the under surface of said truss element also functions as a protective rail or skid causing said apparatus to ride up or over a low lying obstacle unintentionally encountered when said vehicle is moving.

2. An apparatus according to claim 1, wherein said outer end of each said outer strut portion above said truss element houses a fastening assembly for applying a releasable tension to an anchored strap extended over, or connected to, a load carried on said platform.

3. An apparatus according to claim 1, wherein a longitudinal inner area adjacent said outer end of said inner strut portion and spanned by said truss element encloses strengthening web plates attached between said truss element and said outer strut portion.

4. A load carrying apparatus selectively attachable to a vehicle for carrying a load on a platform, said apparatus comprising a pair of transversely spaced, longitudinally extending struts carrying said platform, each said strut having an inner portion adapted to be secured to the underside of said vehicle and an outer portion, each said outer strut portion housing a fastening assembly for applying a releasable tension to a strap anchored at its outer end when extended over, or connected to, a load carried on said platform;

each said fastening assembly comprising a torsion means for strap recoil, an elongated rotatable winching rotor having means for connection of the inboard end of said strap thereto, means for connection of said torsion means thereto, and means for applying a torque thereto, said winching rotor operatively interconnecting said torsion means and the inboard end of said strap, and a clamping means for releasably engaging said strap between its ends, wherein tension is first supplied to said anchored strap by the action of said torsion means on said rotor, and whereby further tension is applied to said anchored strap by a winching force applied to said rotor.

5. A fastening assembly according to claim 4, wherein said torsion means is a coiled spring and said rotor is bolt-shaped having a shank with a shouldered slot, said slot having a throat dimensioned to receive a single thickness of said strap opening into an enlarged groove portion dimensioned to receive a double thickness of said strap, for attaching said strap to said rotor.

6. In a load carrying apparatus (20) selectively attachable to a vehicle (21) for carrying a load (L) on a platform (23), said apparatus (20) comprising a pair of transversely spaced, longitudinally extending struts (22) carrying said platform (23), each said strut (22) having an inner portion (30) adapted to be secured to said vehicle by telescopic insertion into a bracket (24) having an elongate receiver portion (40) connected to the underside of said vehicle (21), each said bracket receiver portion (40) having transverse bores (44), each said inner strut portion (30) having corresponding transverse bores (45); an electrical circuit assembly (28) for supplying current for the illumination of signal lights (29) on said apparatus (20), comprising, a first terminal button (92) carried within an insulating block (93) secured within the inner end of one of said inner strut portions (30) and having connected thereto wiring (90) extending through one of said struts (22) for connection to one of said lights (29), a second terminal button (95) aligned with said first terminal button (92) and carried within an insulating block (96) secured within the inner end of one of said bracket receiver portions (40) and having connected thereto wiring (101) connected to a source of current, one of said terminal buttons being movable and normally biased toward contact with the other of said terminal buttons, the relative placement of each of said terminal buttons to the other being such that current transmitting contact will be made, for illumination of said signal lights (29), when said transverse bores (44,45) in said bracket receiver portions (40) and said inner strut portions (30) are aligned for receiving fastening means.

7. A load carrying apparatus (20) selectively attachable to a vehicle (21) for carrying a load on a platform (23), said apparatus comprising a pair of transversely spaced, longitudinally extending struts (22);

each said strut (22) having an inner portion (30) adapted to be secured to the underside of said vehicle by telescopic insertion into a bracket (24), each said strut (22) being a stepped biplanar element wherein said inner strut portion (30) is longitudinally extending and carries an upwardly directed pedestal portion (31) supporting a longitudinally extending outer portion (32), the outer end of each said outer strut portion (32) having a platform mounting plate secured thereto, the longitudinal extent of said pedestal portion (31) being substantially twice the transverse cross-section of either the adjacent outer end of said inner strut portion (30) or the adjacent inner end of said outer strut portion (32), each said strut (22) further having a longitudinal truss element below said outer strut portion (32) and extending from the outer end thereof to said outer end of said inner strut portion, the under surface of each said truss element (34) functioning as a protective rail or skid causing said apparatus (20) to ride up or over a low lying obstacle unintentionally encountered when said vehicle (21) is moving;

each said bracket (24) having an elongate receiver portion (40) connected to the underside of said vehicle (21);

said apparatus further having an electrical circuit assembly (28) for supplying current for the illumination of a signal light (29) thereon and comprising a first terminal button (92) carried within an insulating block (93) secured within the inner end of one of said inner strut portions (30), a second terminal button (95) aligned with said first terminal button (92) and carried within an insulating block (96) secured within the inner end of one of said bracket receiver portions (40), one of said terminal buttons being movable and normally biased toward contact with the other of said terminal buttons (95), the relative placement of each of said terminal buttons to the other being such that current transmitting contact will be made, for illumination of said signal light (29), when said inner strut portion (30) is correctly positioned within one of said bracket receiver portions (40);

said platform (23) being a trough-shaped member (37) extending transversely across and attached to said outer strut portions (32).

8. A load carrying apparatus selectively attachable to a vehicle for carrying a load on a platform, said apparatus comprising a pair of transversely spaced, longitudinally extending struts (22) supporting said platform, each said strut having an inner portion (30) adapted to be secured to the underside of said vechicle by telescopic insertion into a bracket (24) secured to the underside of said vehicle, each said strut being a stepped biplanar element wherein said inner strut portion is longitudinally extending, each said strut further having an upwardly directed pedestal portion (31) connected at its bottom end to the outer end of said inner strut portion and a longitudinally extending outer portion (32) connected at its inner end to the upper end of said pedestal portion, each said outer strut portion being adapted to mount said platform thereon, each said strut further having a longitudinal truss element (34) extending below said outer strut portion and connected at the outer end thereof and connected at the outer end of said inner strut portion, said truss element comprising a substantially horizontally oriented inner portion and an upwardly inclined outer portion, whereby the under surface of said truss elements also functions as a protective rail or skid causing said apparatus to ride up or over a low lying obstacle unintentionally encountered when said vehicle is moving.

* * * * *